(12) United States Patent
Lien

(10) Patent No.: US 12,234,944 B2
(45) Date of Patent: Feb. 25, 2025

(54) FIXING DEVICE AND FIXING BRACKET HAVING SAME

(71) Applicant: SINOX CO., LTD., New Taipei (TW)

(72) Inventor: Chi-Liang Lien, New Taipei (TW)

(73) Assignee: SINOX CO., LTD., New Taipei (TW)

( * ) Notice: Subject to any disclaimer, the term of this patent is extended or adjusted under 35 U.S.C. 154(b) by 379 days.

(21) Appl. No.: 17/830,083

(22) Filed: Jun. 1, 2022

(65) Prior Publication Data

US 2022/0390062 A1 Dec. 8, 2022

(30) Foreign Application Priority Data

Jun. 3, 2021 (TW) .................................. 110206437

(51) Int. Cl.
*F16M 13/02* (2006.01)
*F16M 13/00* (2006.01)

(52) U.S. Cl.
CPC .......... *F16M 13/02* (2013.01); *F16M 13/005* (2013.01)

(58) Field of Classification Search
CPC .................. F16M 11/041; F16M 13/02; E05B 73/0082; E05B 73/00; A47F 7/0246
See application file for complete search history.

(56) References Cited

U.S. PATENT DOCUMENTS

| 8,711,553 | B2 * | 4/2014 | Trinh | E05B 73/0082 |
| | | | | 361/679.02 |
| 8,998,048 | B1 * | 4/2015 | Wu | F16M 13/02 |
| | | | | 224/443 |
| 9,097,380 | B2 * | 8/2015 | Wheeler | E05B 73/0017 |
| 10,208,777 | B1 * | 2/2019 | Brassard | F16M 11/041 |
| 10,519,991 | B2 * | 12/2019 | Saculles | F16M 11/041 |
| 11,122,917 | B2 * | 9/2021 | Chapuis | F16M 11/041 |
| 11,466,477 | B2 * | 10/2022 | Gulick, Jr. | H04B 1/3877 |
| 11,702,866 | B2 * | 7/2023 | Fraiman | E05B 73/00 |
| | | | | 248/551 |
| 2019/0301665 | A1 * | 10/2019 | Wu | G06F 1/16 |

FOREIGN PATENT DOCUMENTS

| CN | 206386634 U | 8/2017 |
| CN | 212056573 U | 12/2020 |
| TW | M484359 U | 8/2014 |

* cited by examiner

*Primary Examiner* — Bradley Duckworth
(74) *Attorney, Agent, or Firm* — Birch, Stewart, Kolasch & Birch, LLP

(57) ABSTRACT

Provided are a fixing device and a fixing bracket having the same. The fixing device includes a base body, a limiting device, and a first control member. The base body has a support surface. The limiting device includes a limiting member arranged on a side of the support surface and movable along a normal direction of the support surface to fix a portable device to the support surface. The first control member is arranged on a side of the support surface and configured to control movement of the limiting member. When the portable device is fixed to the support surface, the portable device covers at least part of the first control member.

7 Claims, 19 Drawing Sheets

FIXING DEVICE AND FIXING BRACKET HAVING SAME

TECHNICAL FIELD

The utility model relates to a fixing device for fixing a portable device and a fixing bracket having the same.

BACKGROUND

With the development of science and technology and the increasing maturity of industrial technologies, electronic products are becoming lighter, thinner, and shorter, and are increasingly portable. Therefore, in order to prevent the theft of portable electronic products, generally portable electronic products are displayed in the window, and when consumers are interested, the salesperson is asked to take the product out from the window to experience the product, which invisibly reduces inquiries of consumers about the products. Moreover, the consumer may be less willing to experience the product because the salesperson cannot respond to the request of the consumer in a timely manner, which is not conducive to the sales of the product.

Furthermore, the portable electronic product itself lacks a clamping and fixing mechanism and is usually displayed against the support plate, which is easily damaged by sliding or falling from the support plate due to external vibration. Moreover, the sizes of portable electronic products are not the same. Therefore, how to effectively fix portable electronic products of different sizes and improve the anti-theft performance has become an issue of concern to the industry.

SUMMARY

An objective of the utility model is to provide a fixing device for fixing a portable device and a fixing bracket having the same, which is more convenient for use and solves the problems in the prior art.

The fixing device of the utility model includes a base body, a limiting device, and a first control member. The base body has a support surface. The limiting device includes a limiting member arranged on a side of the support surface and movable along a normal direction of the support surface to fix a portable device to the support surface. The first control member is arranged on a side of the support surface and configured to control movement of the limiting member. When the portable device is fixed to the support surface, the portable device covers at least part of the first control member.

In the embodiment of the utility model, a limiting device hollowed-out portion is arranged on a surface of the limiting device, and the first control member is arranged in the limiting device. The first control member includes a first operating portion. The first operating portion is exposed from the limiting device hollowed-out portion. When the portable device is fixed to the support surface, the portable device covers at least part of the first operating portion.

In the embodiment of the utility model, the support surface extends along a direction parallel to an X-Y plane, the limiting member is movable along a direction of a Z-axis, and an X-axis, a Y-axis, and the Z-axis are orthogonal. The limiting device is parallel to a Y-Z plane, and the limiting device hollowed-out portion is arranged on a surface of the limiting device facing the support surface. The first control member is movable along the X-axis to control the movement of the limiting member.

In the embodiment of the utility model, a support surface hollowed-out portion is arranged on the support surface, and the first control member is arranged below the support surface. The first control member includes a first operating portion. The first operating portion is exposed from the support surface hollowed-out portion. When the portable device is fixed to the support surface, the portable device covers at least part of the first operating portion.

In the embodiment of the utility model, the support surface extends along a direction parallel to an X-Y plane, the limiting member is movable along a direction of a Z-axis, and an X-axis, a Y-axis, and the Z-axis are orthogonal. The first control member is movable along the X-axis to control the movement of the limiting member.

The fixing bracket of the utility model includes a first portion and a second portion connected to the first portion. At least one of the first portion or the second portion includes the foregoing fixing device and is movable toward the other of the first portion or the second portion, to securely hold the portable device between the first portion and the second portion.

In the embodiment of the utility model, the fixing bracket further includes a second control member. The second control member is arranged in at least one of the first portion or the second portion and configured to control movement of the at least one of the first portion or the second portion.

In the embodiment of the utility model, the second control member is arranged on an other side of the base body opposite to the support surface.

In the embodiment of the utility model, the second control member is arranged below the support surface. The second control member includes a second operating portion. The second operating portion is exposed from a support surface hole of the support surface. When the portable device is securely held between the first portion and the second portion, the portable device covers at least part of the second operating portion.

In the embodiment of the utility model, the fixing bracket further includes a locking device. The locking device is arranged in at least one of the first portion or the second portion. When the locking device is in a locked state, movement of the first portion and the second portion is restricted.

DETAILED DESCRIPTION

Figure 1A:
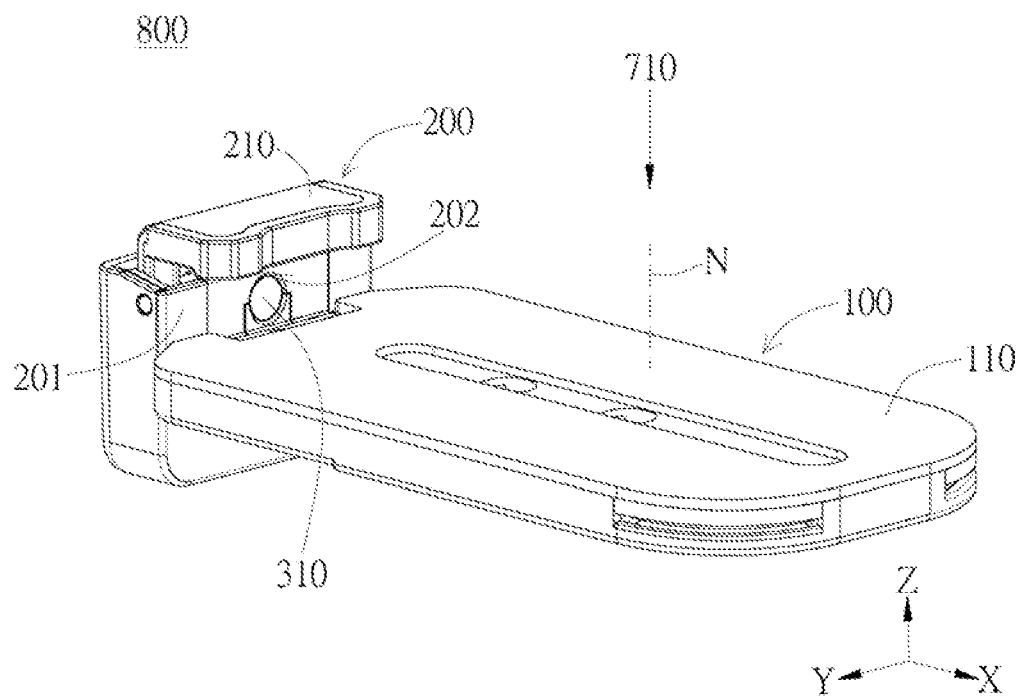
FIG. 1A and FIG. 1B are schematic three-dimensional views of an embodiment of a fixing device according to the utility model.
Figure 1B:
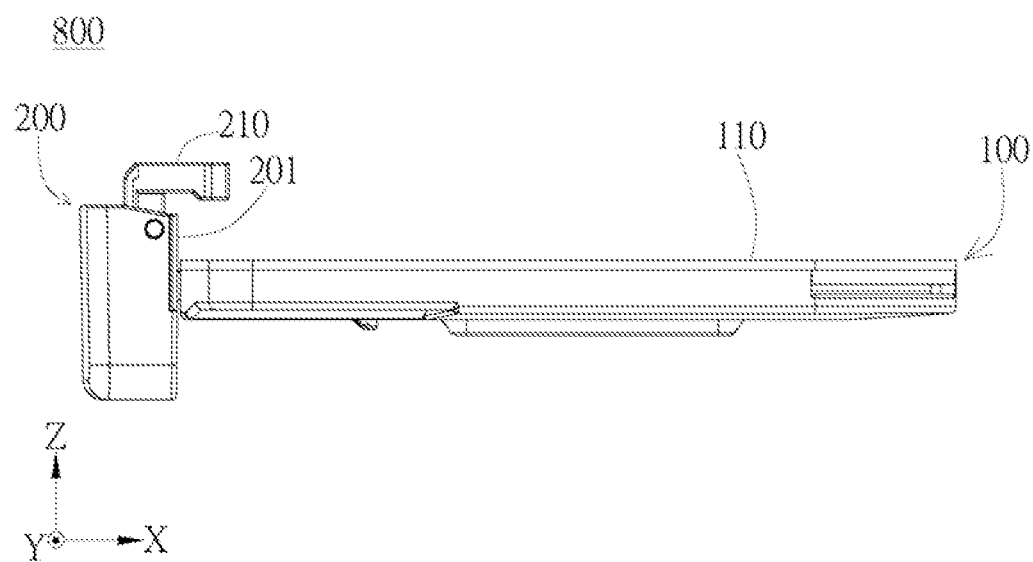

The utility model provides a fixing device and a fixing bracket having the same. The fixing device may be configured to fix a portable device, especially a portable electronic device. For example, the portable device includes, but is not limited to, a valuable 3C electronic product with high portability, such as a tablet computer, an e-book, and a mobile phone. The architecture and operations of the utility model are described in detail below with reference to the accompanying drawings.

In the embodiments shown in FIG. 1A to FIG. 2C, a fixing device 800 of the utility model includes a base body 100, a limiting device 200, and a first control member 310. The base body 100 has a support surface 110. The base body 100 may be an object that is convenient to move, such as a display stand, or an object that is inconvenient to move, such as a table. The support surface 110 may be any plane that has a supporting effect, for example, but not limited to a straight plane, a surface having grooves or holes, or a mesh surface.

In the embodiments shown in FIG. 1A to FIG. 2C, the limiting device 200 includes a limiting member 210 arranged on one side of the support surface 100. The limiting member 210 is movable along a first direction 710 to fix the portable device (see FIG. 3 to FIG. 6B) to the support surface 110. The first direction 710 is preferably perpendicular to the support surface 110. That is to say, the first direction is the same as a normal direction N of the support surface 100. However, in different embodiments, an included angle may be formed between the first direction 710 and the normal direction N of the support surface 110. More specifically, the limiting device 200 includes a housing 220 composed of a first housing 220A and a second housing 220B. The first housing 220A and the second housing 220B are combined to form an accommodating space for accommodating the limiting member 210 and allowing the limiting member 210 to move relative to the accommodating space. A limiting device hollowed-out portion 202 is arranged on a surface 201 of the limiting device 200.

In the embodiments shown in FIG. 1A to FIG. 2C, the first control member 310 is arranged on one side of the support surface 110 for controlling the movement of the limiting member 210. When the portable device is fixed to the support surface 110, the portable device covers at least part of the first control member 310. In an embodiment, the first control member 310 is arranged in the accommodating space in the limiting device 200. The first control member 310 includes a first operating portion 311. The first operating portion 311 is exposed from the limiting device hollowed-out portion 202. When the portable device is fixed to the support surface 110, the portable device covers at least part of the first operating portion 311.

Figure 2A:
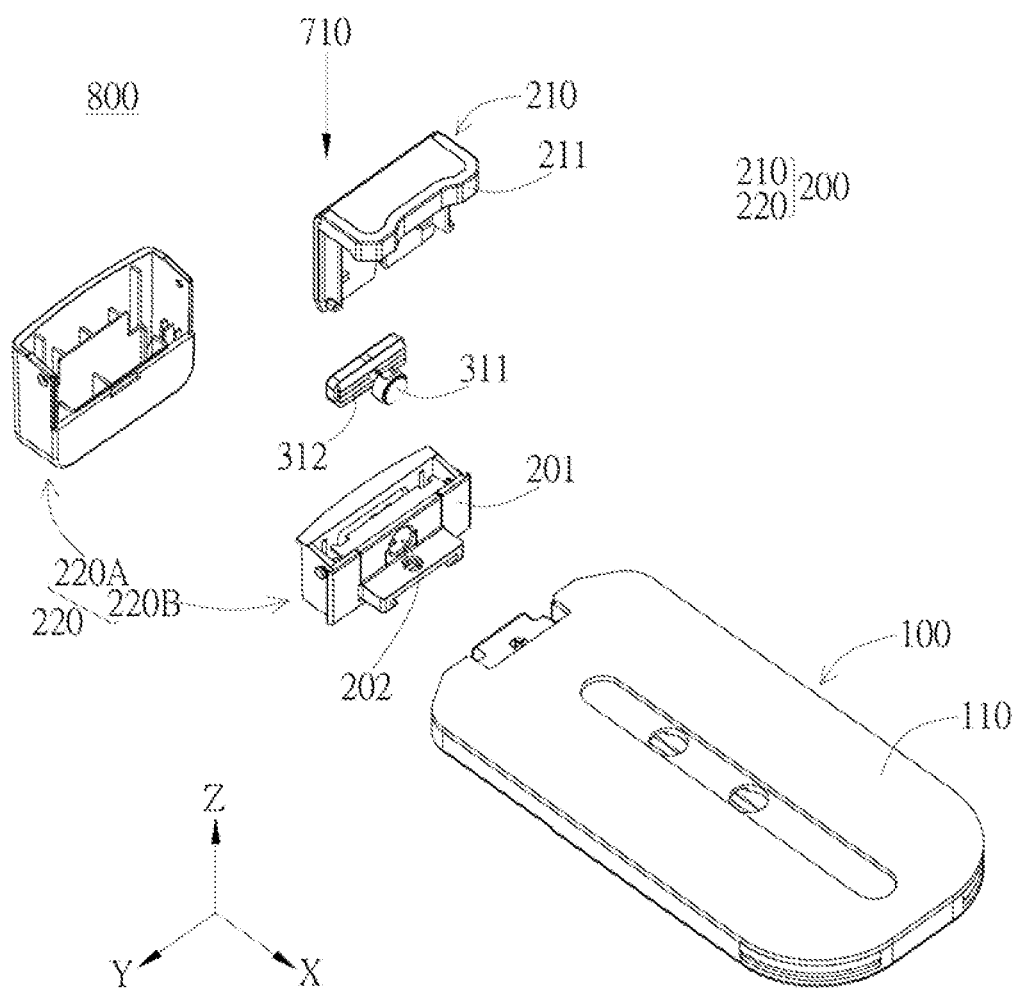
FIG. 2A to FIG. 2C are schematic exploded views of an embodiment of a fixing device according to the utility model.
Figure 2B:
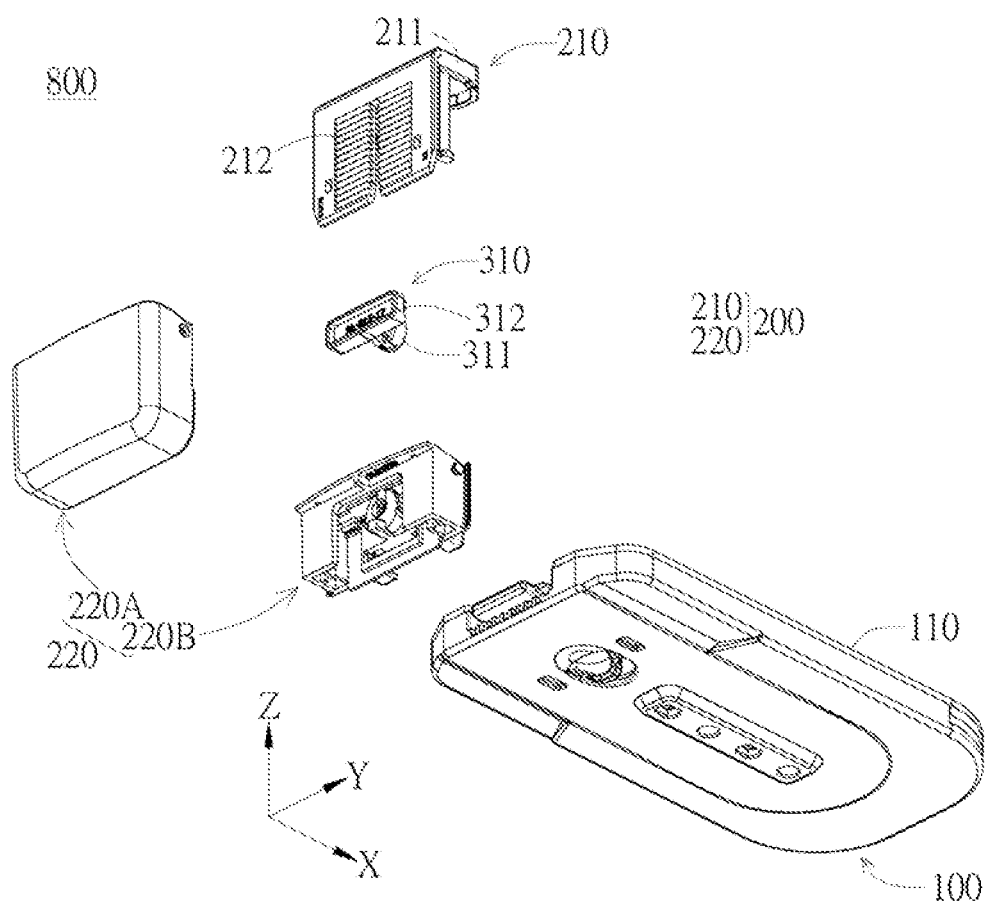
Figure 2C:
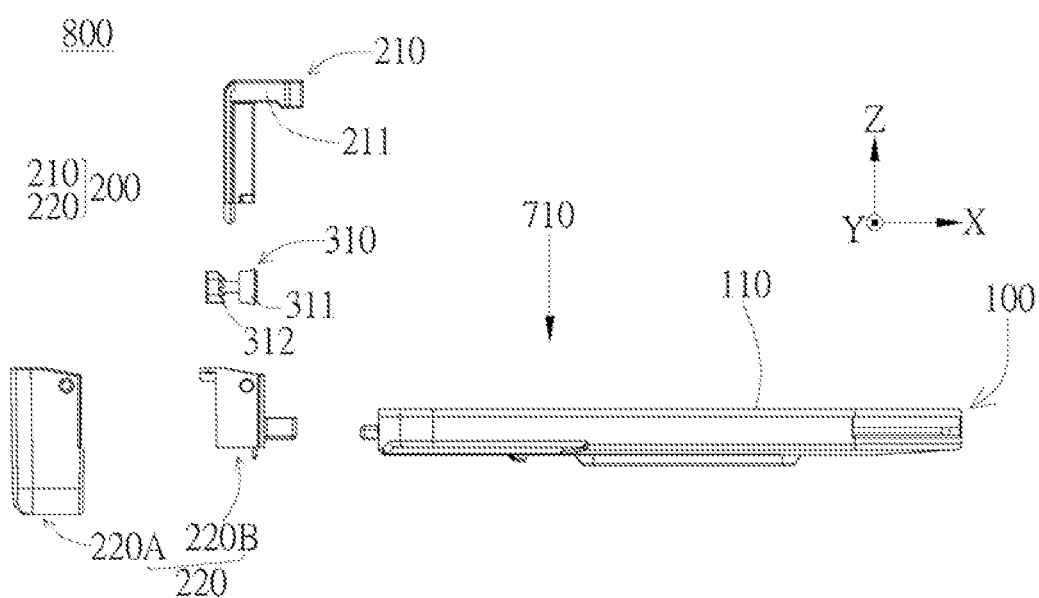
Figure 3:
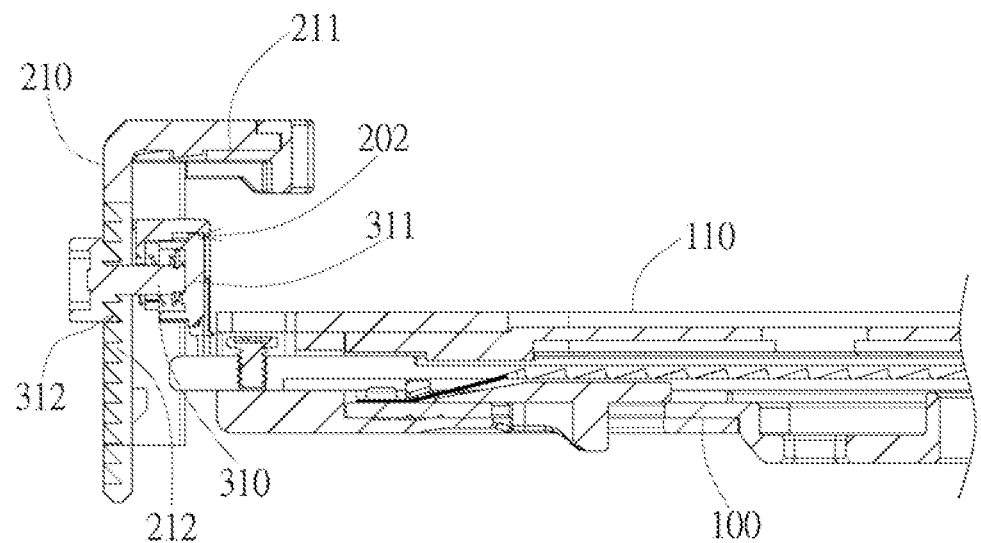
FIG. 3 to FIG. 6B are cross-sectional views of an embodiment of a fixing device according to the utility model.
Figure 4:
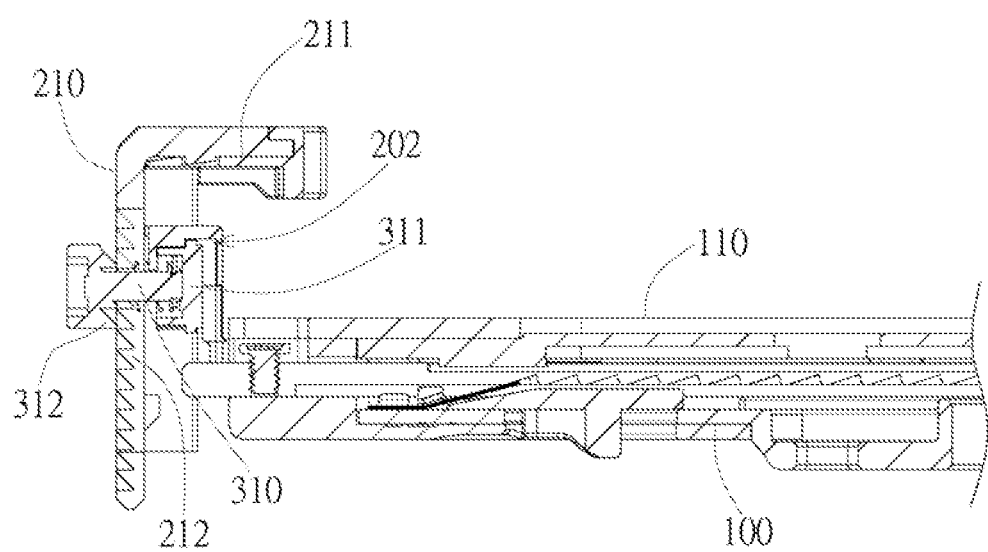

More specifically, in the embodiments shown in FIG. 2A to FIG. 2C, the support surface 110 extends along a direction parallel to an X-Y plane, the limiting member 210 is movable along a direction of a Z-axis, and an X-axis, a Y-axis, and the Z-axis are orthogonal. The limiting device 200 is parallel to a Y-Z plane, and the limiting device hollowed-out portion 202 is arranged on a surface of the limiting device facing the support surface 110. The first control member 310 is movable along the X-axis to control the movement of the limiting member 210.

In this embodiment, a toothed engagement unit 312 is arranged on a surface of the first control member 310 facing the support surface 110. The limiting member 210 includes a plurality of ratchet teeth 212. The plurality of ratchet teeth 212 are arranged in a row on another surface of the limiting member 210 opposite to the support surface 110. Specifically, the plurality of ratchet teeth 212 are arranged on a back surface of the limiting member 210 in a row at the same interval along a long axis direction of the limiting member 210. That is to say, the plurality of ratchet teeth 212 are arranged at a position where the limiting member 210 faces the toothed engagement unit 312, so that the toothed engagement unit 312 is engaged with one of the plurality of ratchet teeth 212 by an interference fit to cause the limiting member 210 to move only in one direction. In this embodiment, the plurality of ratchet teeth 212 are arranged to be engaged with the toothed engagement unit 312 by an interference fit, so that the limiting member 210 is only allowed to move toward the support surface 110 along the direction of the Z-axis (that is, the first direction 710). That is to say, the limiting member 210 is only allowed to move in a direction of reducing a distance between a clamping portion 211 of the limiting member and the support surface 110. When a user applies a force to the first operating portion 311 exposed from the limiting device hollowed-out portion 202, the toothed engagement unit 312 is separated from the plurality of ratchet teeth 212 along the X direction, and the interference between the plurality of ratchet teeth 212 and the toothed engagement unit 312 is released. In this way, the limiting member 210 can move freely along the direction of the Z-axis, that is to say, the limiting member 210 can move in a direction of increasing or decreasing the distance between the clamping portion 211 of the limiting member and the support surface 110. A pitch between the ratchet teeth 212 is a unit distance by which the limiting member 210 moves opposite to the support surface 110.

Figure 5A:
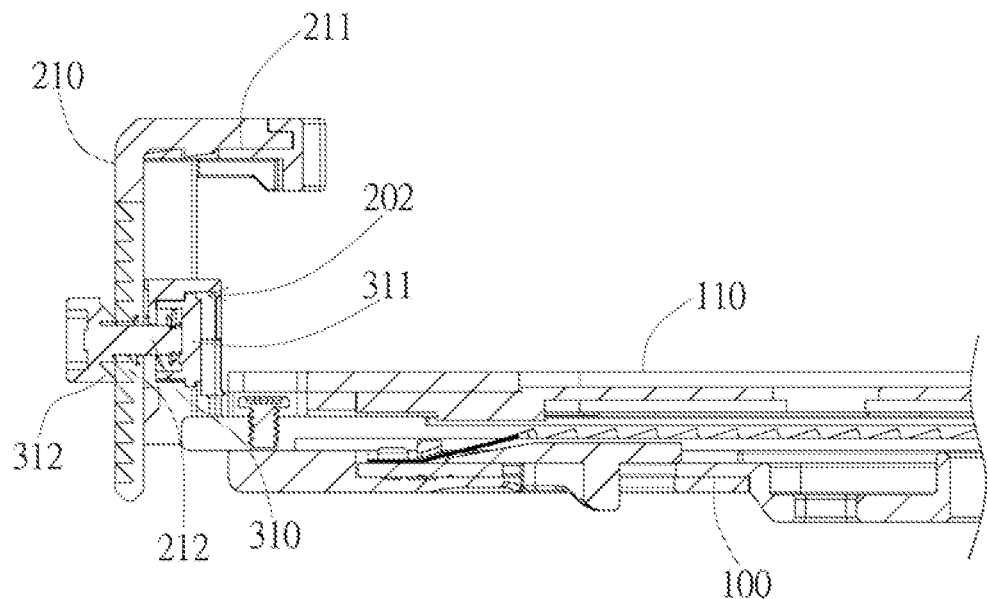
Figure 5B:
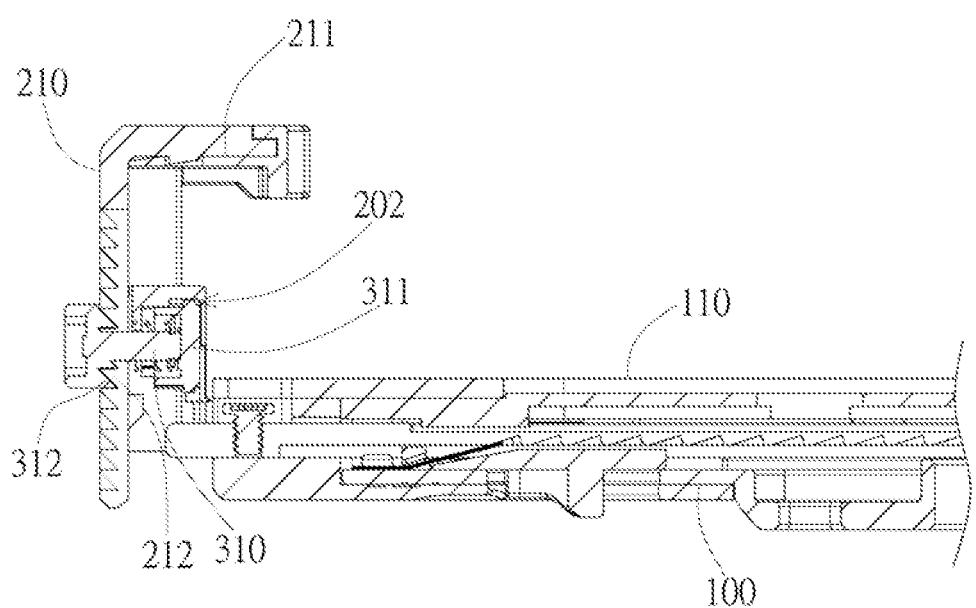

The process of using the fixing device 800 to fix the portable device 700 is described below by using the cross-sectional views of the embodiments shown in FIG. 3 to FIG. 6. In order to make the drawings more concise to facilitate understanding, elements such as the first housing 220A are omitted. In the embodiment shown in FIG. 3, under an elastic force of, for example, an elastic element such as a spring arranged between the toothed engagement unit 312 and an inner wall of the housing 220 (see FIG. 2A to FIG. 2C), the toothed engagement unit 312 moves toward and is engaged with the plurality of ratchet teeth 212 by an interference fit, so that the limiting member 210 is only allowed to move toward the support surface 110. In the embodiment shown in FIG. 4, when a user applies a force F1 to the first operating portion 311 exposed from the limiting device hollowed-out portion 202, the toothed engagement unit 312 may be separated from the plurality of ratchet teeth 212 along the X direction, and the interference between the plurality of ratchet teeth 212 and the toothed engagement unit 312 is released. In this way, the limiting member 210 can move freely along the direction of the Z-axis. In the embodiment shown in FIG. 5A, the user can pull up the limiting member 210 to move the limiting member to a predetermined position in the direction of increasing the distance between the clamping portion 211 of the limiting member and the support surface 110 (that is, upward). Then, as shown in FIG. 5B, when the user stops applying a force to the first operating portion 311, the toothed engagement unit 312 is engaged with the plurality of ratchet teeth 212 again by an interference fit under the elastic force of the elastic element, so that the limiting member 210 is only allowed to move toward the support surface 110 (that is, downward).

Figure 6A:
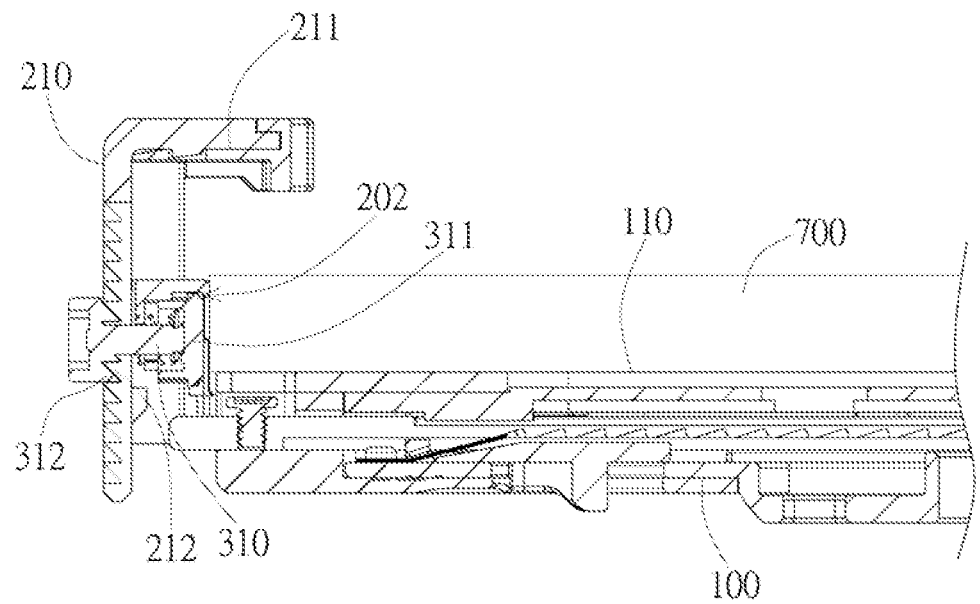
Figure 6B:
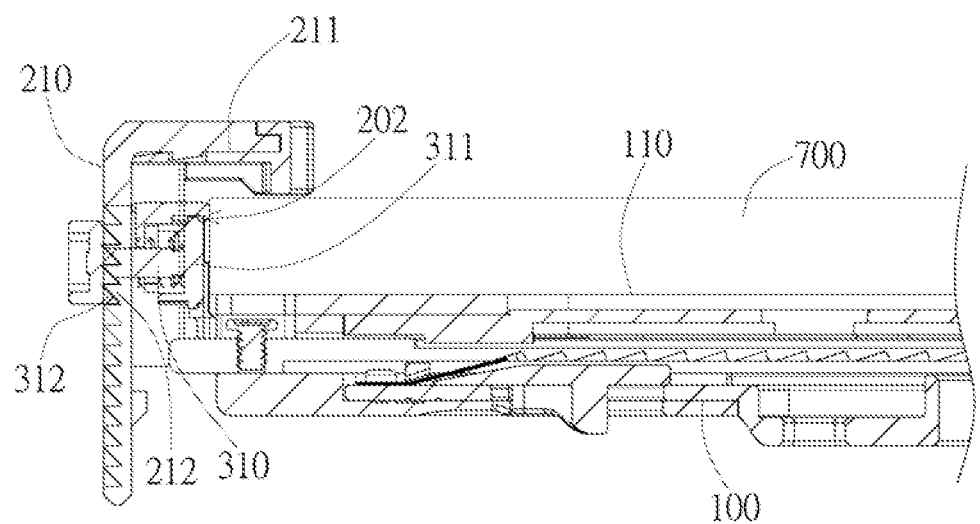

In the embodiment shown in FIG. 6A, in this case, the user can place the portable device 700 on the support surface 110, and then press down the limiting member 210 as shown in FIG. 6B, so that the limiting member moves, in the direction of reducing the distance between the clamping portion 211 of the limiting member and the support surface 110 (that is, downward), to a position where the limiting member abuts against the portable device 700. Since the limiting member 210 is only allowed to move toward the support surface 110 (that is, downward) at this time, the portable device 700 can be fixed to the support surface 110. In addition, since an end of the portable device 700 covers the limiting device hollowed-out portion 202 at this time, that is, covers at least part of the first control member 310, and more specifically, covers at least part of the first operating portion 311, the user cannot apply a force to the first control member 310. In this way, the first control member 310 may be prevented from releasing the restriction on the movement of the limiting member 210 due to an external force, and the limiting member 210 may be prevented from moving upward to cause the portable device 700 to be separated from the support surface 110.

Based on the above, the user can fix the portable device 700 through simple operations. In addition, since the limiting member 210 can move along the normal direction N of the support surface 110 to adjust the distance between the limiting member and the support surface 110, the fixing device 800 may be applicable to the portable electronic products 700 having different thicknesses, and is more convenient for use.

In the above embodiment, the first control member 310 is arranged on a side of the support surface 110, and the first operating portion 311 of the first control member is exposed from the limiting device hollowed-out portion 202 located on the surface 201 of the limiting device 200 facing the support surface 110. Therefore, as shown in FIG. 6B, when the portable device is fixed to the support surface 110, an operable part of the first control member 310 is covered by a side surface of the portable device 700. However, in different embodiments, the arrangement manner or the position of the first control member 310 may be adjusted according to the requirements for use, manufacturing, or design, so that the operable part of the first control member is covered by a part outside the side surface of the portable device 700. In this way, when the portable device is fixed to the support surface 110, the first control member 310 is prevented from releasing the restriction on the movement of the limiting member 210 due to an external force, and the limiting member 210 is prevented from moving upward to cause the portable device 700 to be separated from the support surface 110.

Figure 7A:
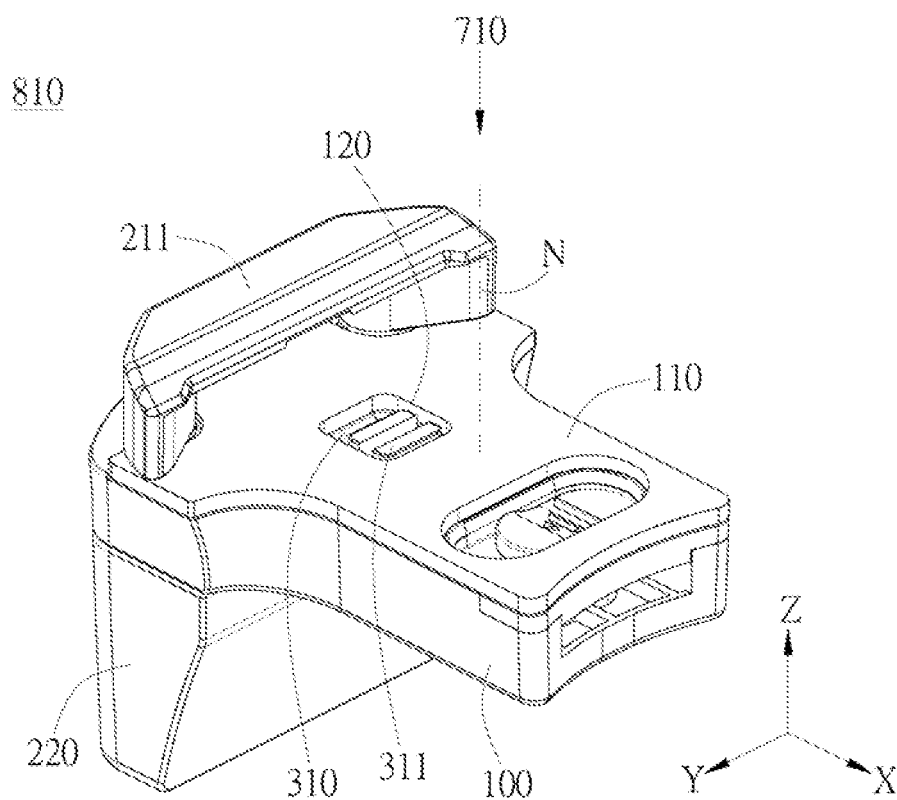
FIG. 7A to FIG. 11D are schematic diagrams of different embodiments of a fixing device according to the utility model.
Figure 7B:
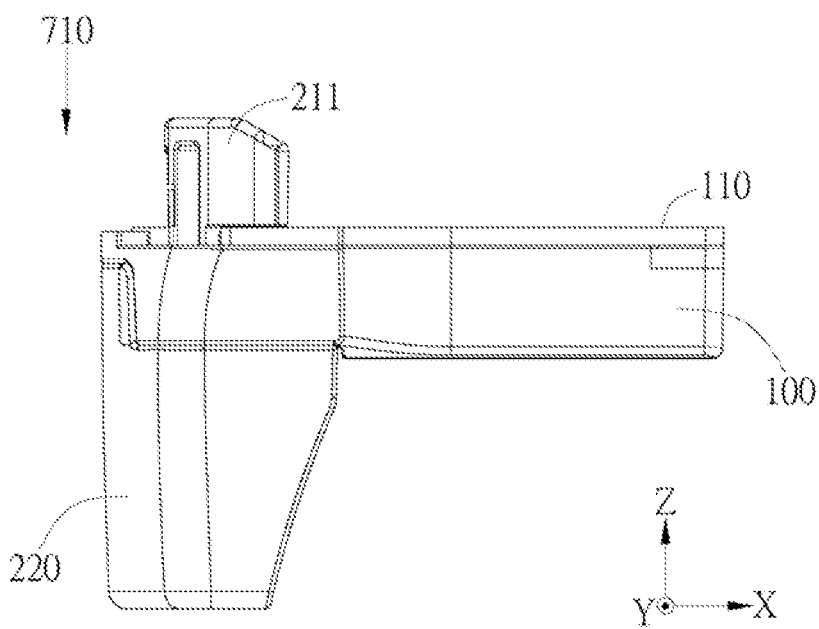
Figure 8A:
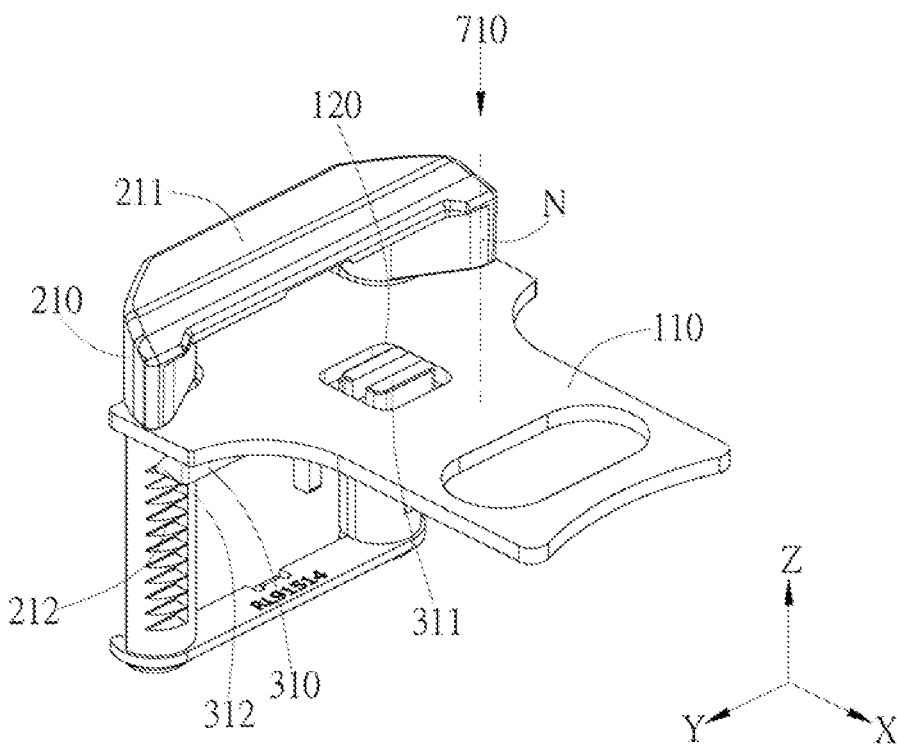
Figure 8B:
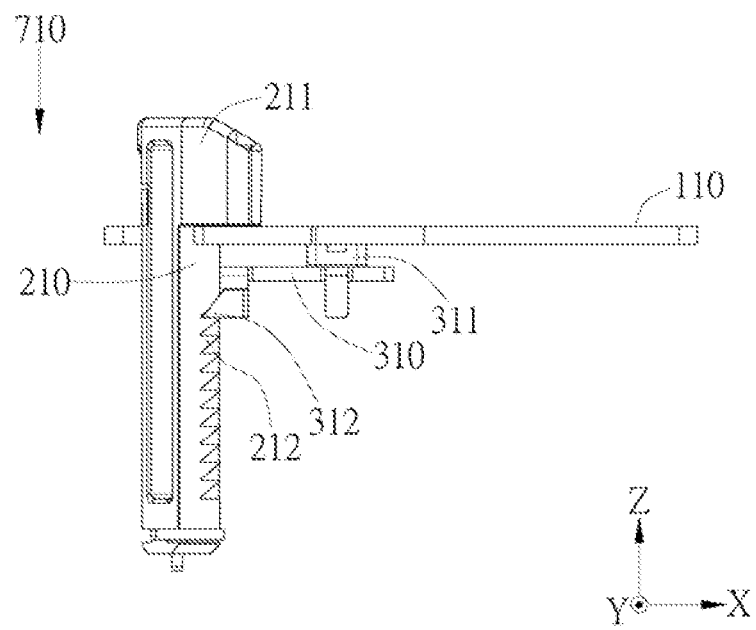
Figure 9A:
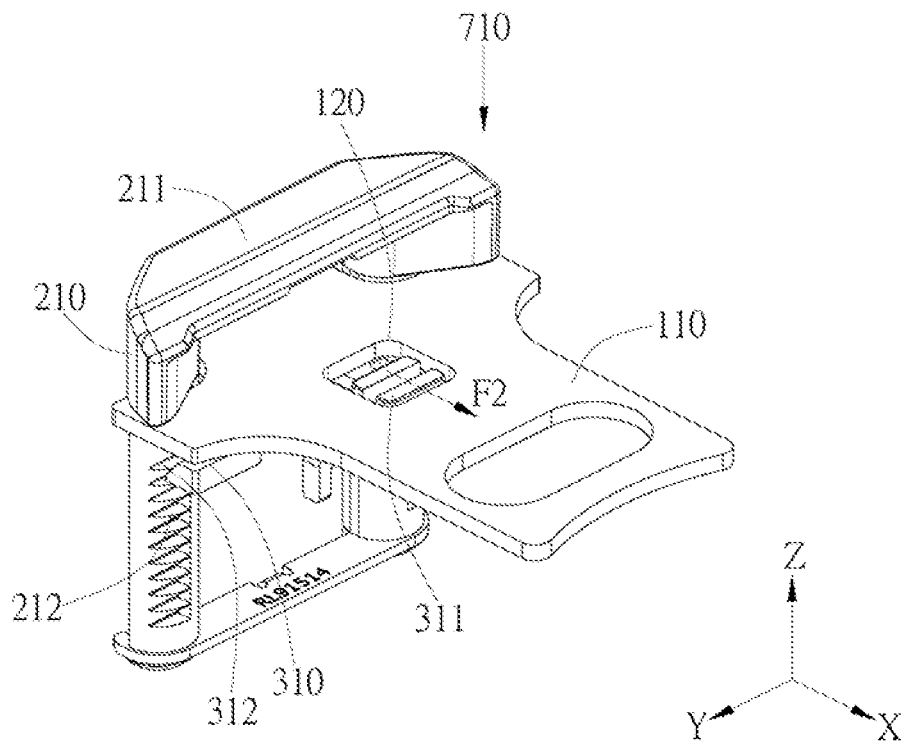
Figure 9B:
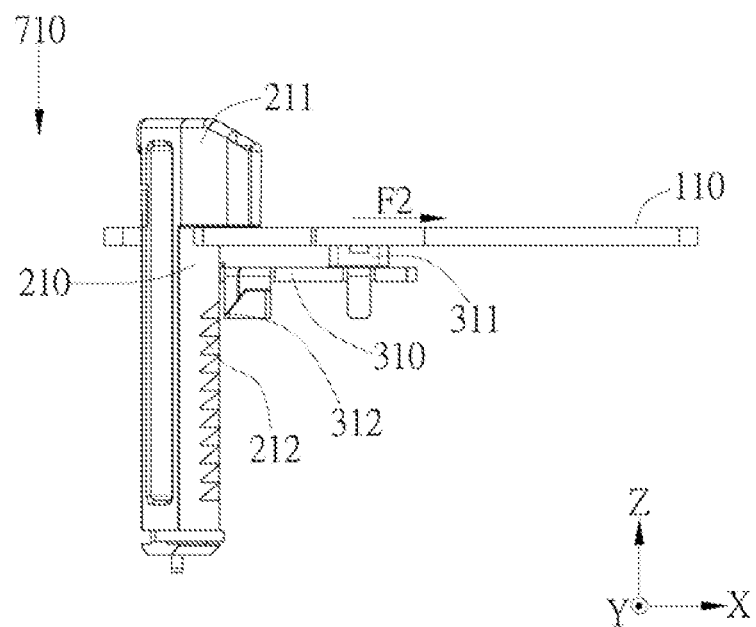
Figure 10A:
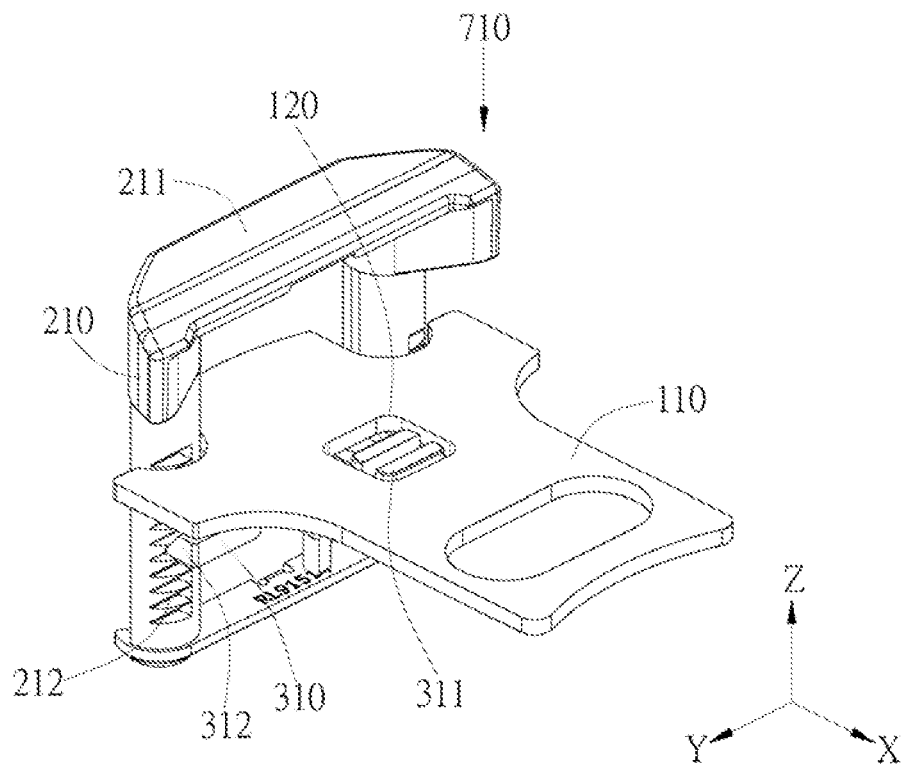
Figure 10B:
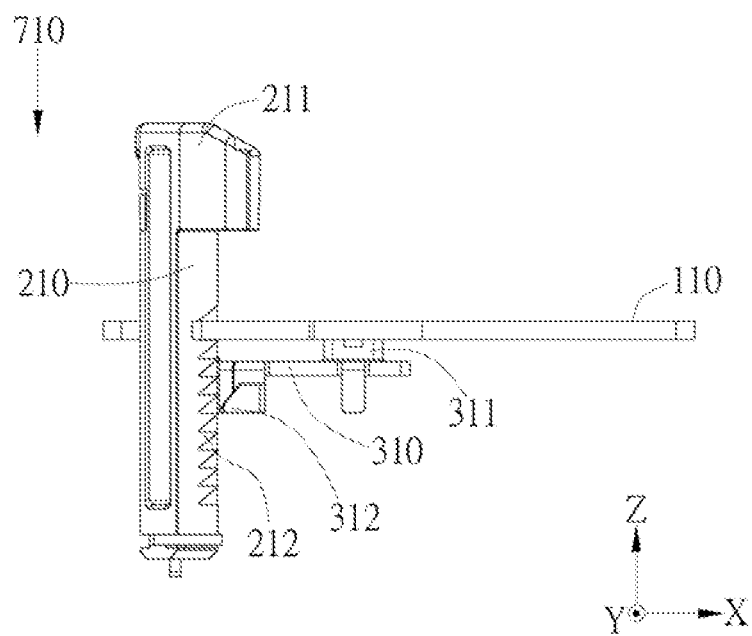

In different embodiments shown in FIG. 7A and FIG. 7B, a support surface hollowed-out portion 120 is arranged on the support surface 110 of a fixing device 810, and the first control member 310 is arranged below the support surface 110. The first control member 310 includes a first operating portion 311. The first operating portion 311 is exposed from the support surface hollowed-out portion 120. When the portable device is fixed to the support surface 110, the portable device 110 covers at least part of the first operating portion 311.

More specifically, in the embodiments shown in FIG. 8A to FIG. 11B, the support surface 110 extends along a direction parallel to an X-Y plane, the limiting member 210 is movable along a direction of a Z-axis, and an X-axis, a Y-axis, and the Z-axis are orthogonal. The first control member 310 has a connecting portion and is movable along the X-axis to control the movement of the limiting member 210. In this embodiment, the first operating portion 311 exposed from the support surface hollowed-out portion 120 and the toothed engagement unit 312 facing the limiting member 210 are respectively arranged on two ends of the first control member 310. The limiting member 210 includes a plurality of ratchet teeth 212. The plurality of ratchet teeth 212 are arranged in a row on a surface of the limiting member 210 opposite to the support surface 110. Specifically, the plurality of ratchet teeth 212 are arranged on a front surface of the limiting member 210 in a row at the same interval along a long axis direction of the limiting member 210. That is to say, the plurality of ratchet teeth 212 are arranged at a position where the limiting member 210 faces the toothed engagement unit 312, so that the toothed engagement unit 312 is engaged with one of the plurality of ratchet teeth 212 by an interference fit to cause the limiting member 210 to move only in one direction. In this embodiment, the plurality of ratchet teeth 212 are arranged to be engaged with the toothed engagement unit 312 by an interference fit, so that the limiting member 210 is only allowed to move toward the support surface 110 along the direction of the Z-axis (that is, the first direction 710). That is to say, the limiting member 210 is only allowed to move in a direction of reducing a distance between a clamping portion 211 of the limiting member and the support surface 110. When a user applies a force to the first operating portion 311 exposed from the support surface hollowed-out portion 120, the toothed engagement unit 312 is separated from the plurality of ratchet teeth 212 along the X direction, and the interference between the plurality of ratchet teeth 212 and the toothed engagement unit 312 is released. In this way, the limiting member 210 can move freely along the direction of the Z-axis, that is to say, the limiting member 210 can move in a direction of increasing or decreasing the distance between the clamping portion 211 of the limiting member and the support surface 110. A pitch between the ratchet teeth 212 is a unit distance by which the limiting member 210 moves opposite to the support surface 110.

Figure 11A:
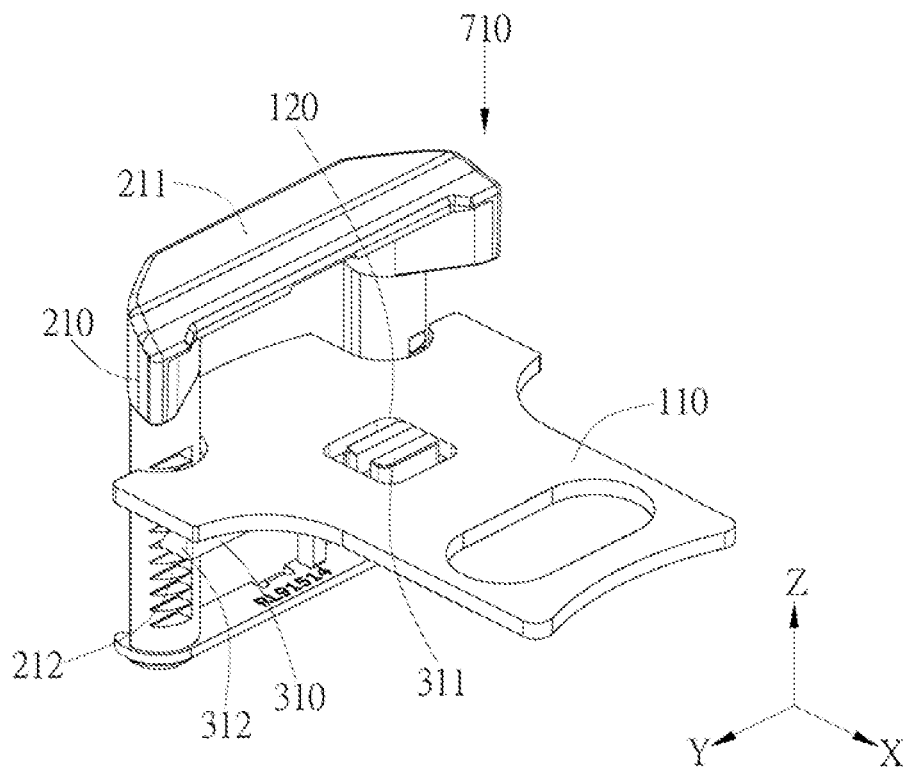
Figure 11B:
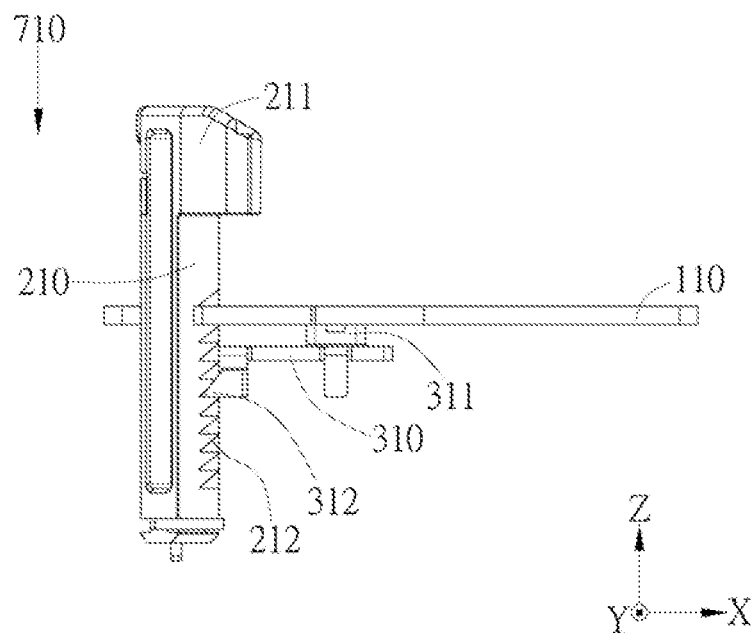

The process of using the fixing device 800 to fix the portable device 700 is described below by using the embodiments shown in FIG. 8A to FIG. 11B. In the embodiments shown in FIG. 8A and FIG. 8B, under an elastic force of, for example, an elastic element such as a spring arranged between the toothed engagement unit 312 and an inner wall of the housing 220 (see FIG. 7A to FIG. 7B), the toothed engagement unit 312 moves toward and is engaged with the plurality of ratchet teeth 212 by an interference fit, so that the limiting member 210 is only allowed to move toward the support surface 110. In the embodiment shown in FIG. 9A and FIG. 9B, when a user applies a force F2 to the first operating portion 311 exposed from the limiting device hollowed-out portion 202, the toothed engagement unit 312 may be separated from the plurality of ratchet teeth 212 along the X direction, and the interference between the plurality of ratchet teeth 212 and the toothed engagement unit 312 is released. In this way, the limiting member 210 can move freely along the direction of the Z-axis. In the embodiments shown in FIG. 10A and FIG. 10B, the user can pull up the limiting member 210 to move the limiting member to a predetermined position in the direction of increasing the distance between the clamping portion 211 of the limiting member and the support surface 110 (that is, upward). Then, as shown in FIG. 11A and FIG. 11B, when the user stops applying a force to the first operating portion 311, the toothed engagement unit 312 is engaged with the plurality of ratchet teeth 212 again by an interference fit under the elastic force of the elastic element, so that the limiting member 210 is only allowed to move toward the support surface 110 (that is, downward).

Figure 11C:
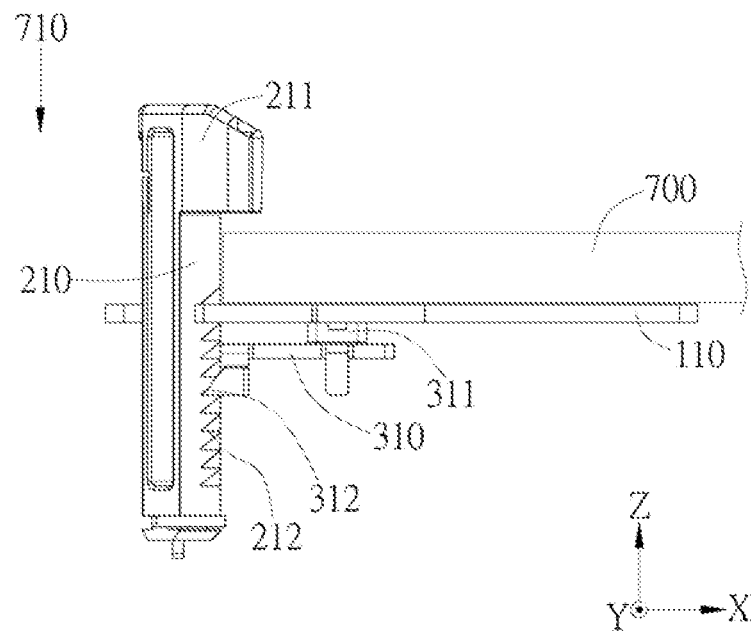
Figure 11D:
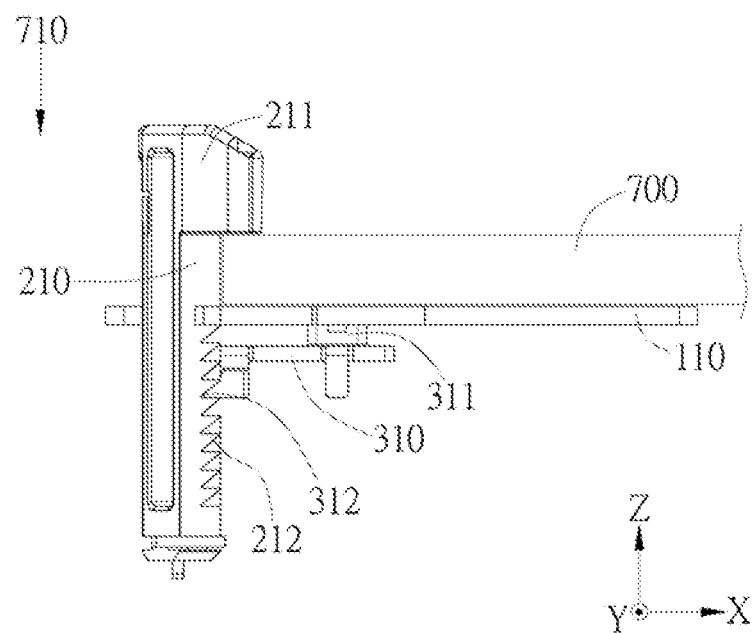

In the embodiment shown in FIG. 11C, in this case, the user can place the portable device 700 on the support surface 110, and then press down the limiting member 210 as shown in FIG. 11D, so that the limiting member moves, in the direction of reducing the distance between the clamping portion 211 of the limiting member and the support surface 110 (that is, downward), to a position where the limiting member abuts against the portable device 700. Since the limiting member 210 is only allowed to move toward the support surface 110 (that is, downward) at this time, the portable device 700 can be fixed to the support surface 110. In addition, since a bottom surface of the portable device 700 covers the support surface hollowed-out portion 120 at this time, that is, covers at least part of the first control member 310, and more specifically, covers at least part of the first operating portion 311, the user cannot apply a force to the first control member 310. In this way, the first control member 310 may be prevented from releasing the restriction on the movement of the limiting member 210 due to an external force, and the limiting member 210 may be prevented from moving upward to cause the portable device 700 to be separated from the support surface 110.

The above fixing device may be configured to assemble a fixing bracket. Further, if a bracket can generate a limiting effect on two sides of the portable device, the bracket has the effect of fixing the portable device and can be used as a fixing bracket. In other words, in the fixing bracket assembled by the above fixing device, at least two opposite parts correspond to different sides of the portable device, and at least one of the two opposite parts is the above fixing device.

Figure 12A:
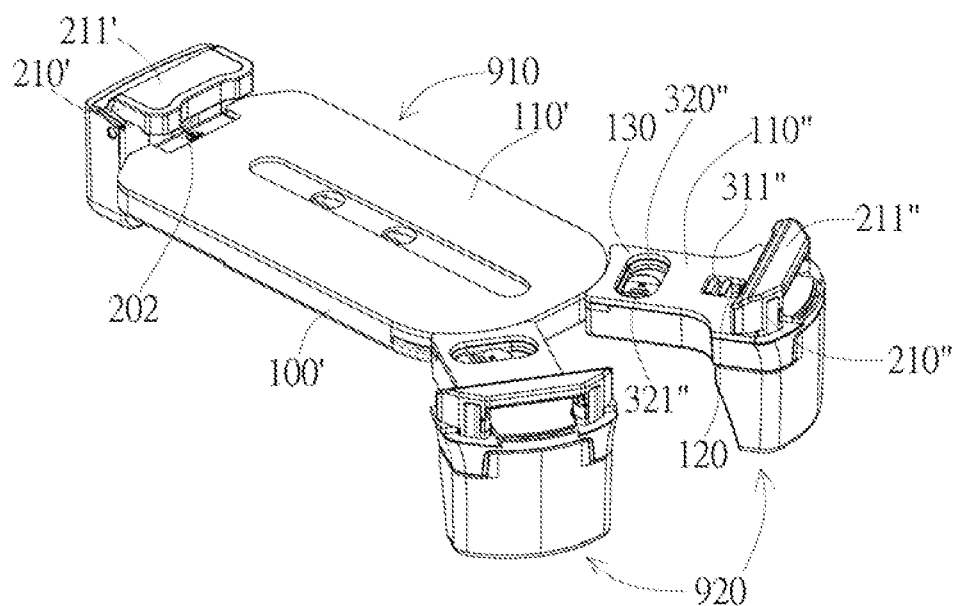
FIG. 12A to FIG. 14B are schematic diagrams of an embodiment of a fixing bracket according to the utility model.
Figure 12B:
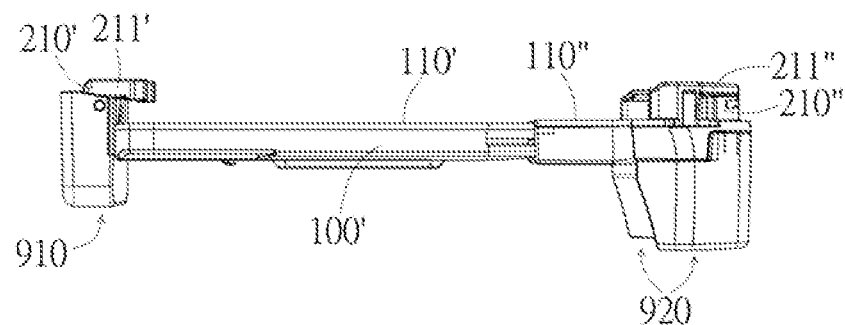
Figure 12C:
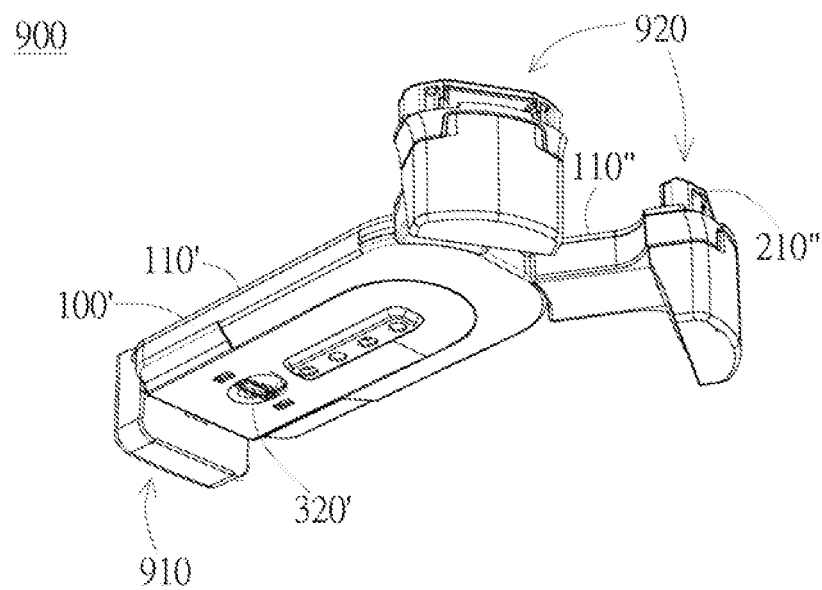
Figure 12D:
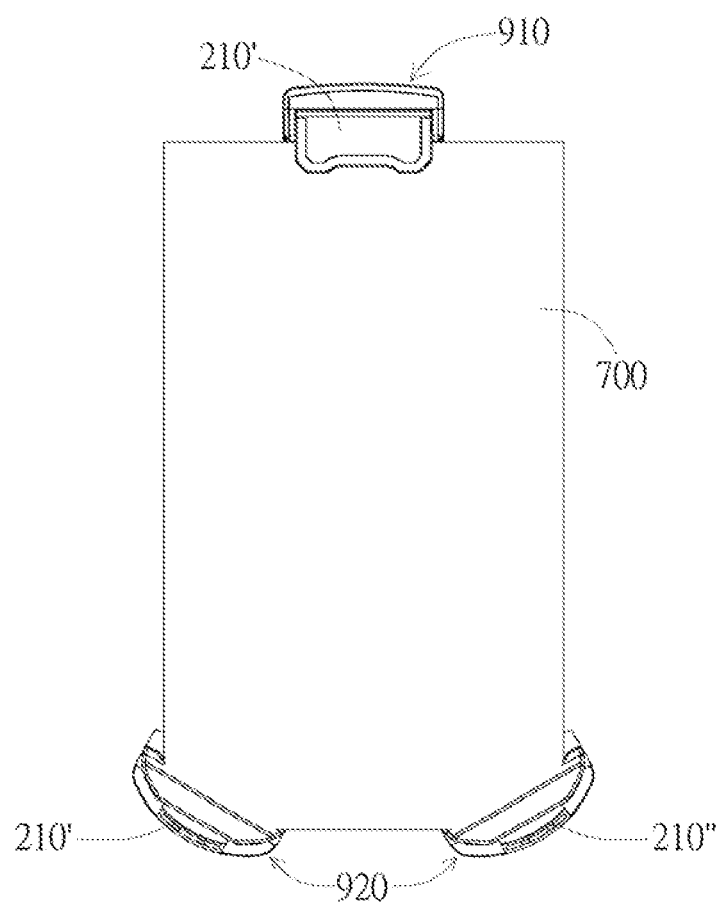
Figure 13A:
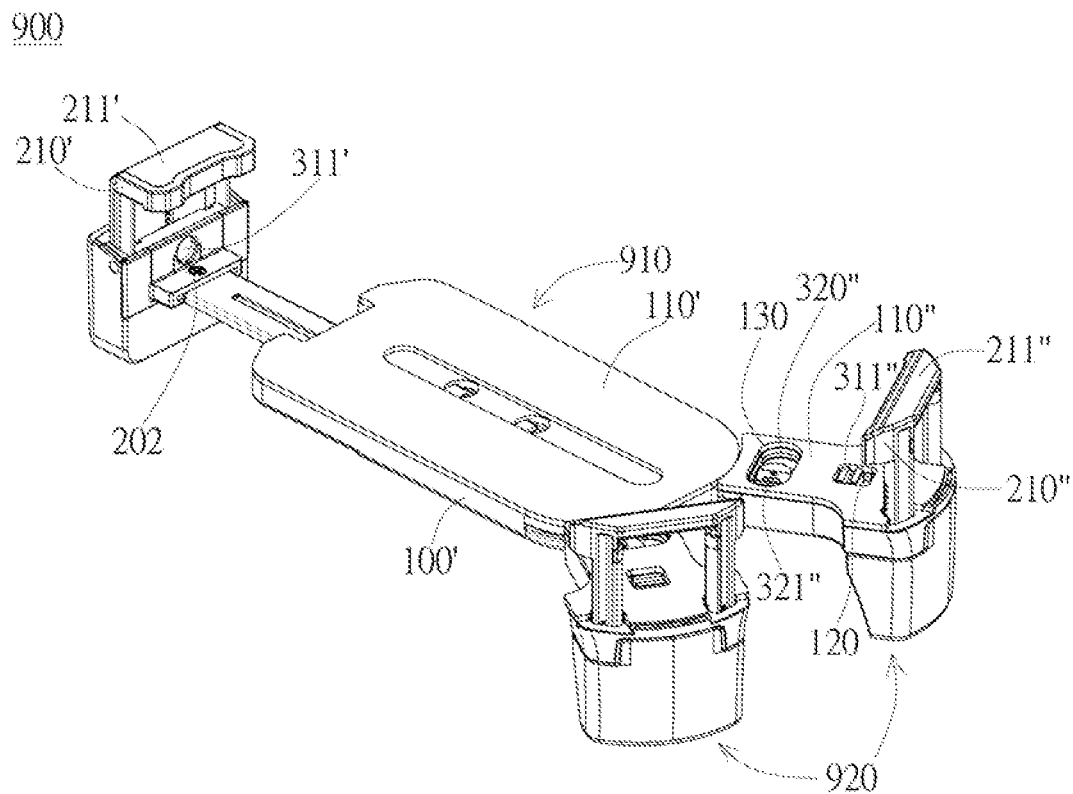
Figure 13B:
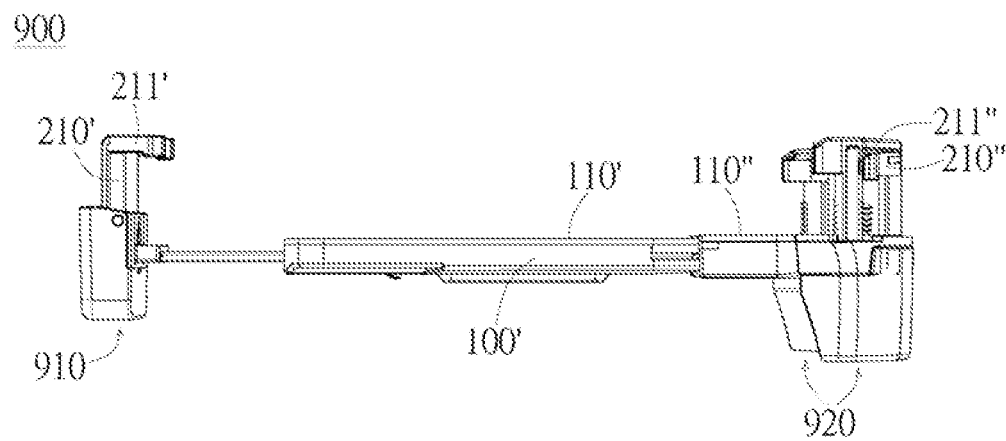
Figure 13C:
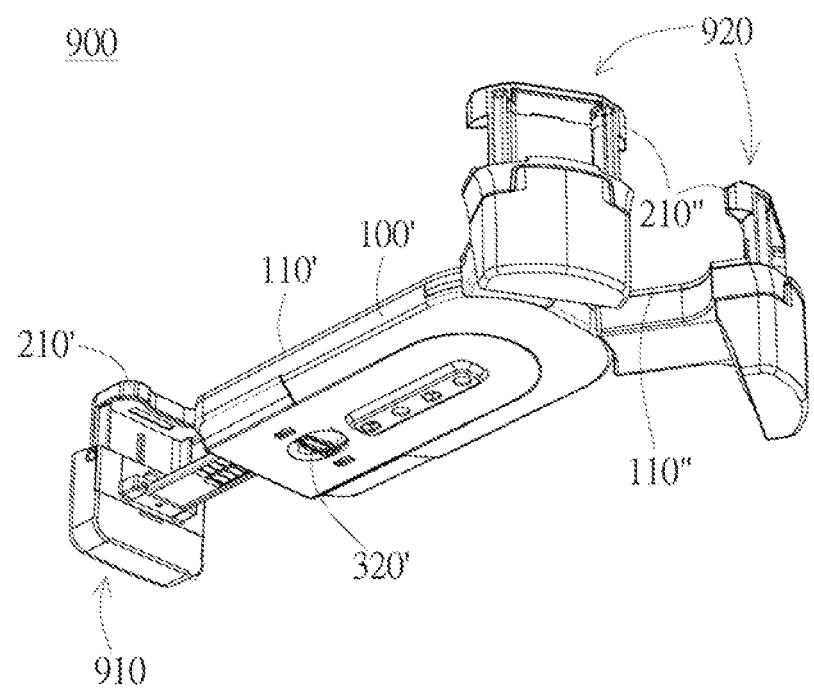

More specifically, in the embodiments shown in FIG. 12A to FIG. 12C, the fixing bracket 900 includes a first portion 910 and a second portion 920 connected to the first portion 910. At least one of the first portion 910 or the second portion 920 includes the fixing device of the utility model. In the embodiment shown in FIG. 12D, at least one of the first portion 910 or the second portion 920 is movable toward each other, to securely hold the portable device between the first portion 910 and the second portion 920. In this embodiment, the first portion 910 is the fixing device in which the first operating portion is exposed from the limiting device hollowed-out portion (see FIG. 1A), and the second portion 920 is the fixing device in which the first operating portion is exposed from the support surface hollowed-out portion (see FIG. 7A). A support surface 110' of the first portion 910 and a support surface 110" of the second portion 920 are coplanar.

In the embodiments shown in FIG. 12A and FIG. 12C, the fixing bracket 900 further includes second control members 320' and 320" respectively arranged in at least one of the first portion 910 or the second portion 920 and configured to control movement of the first portion 910 and the second portion 920. More specifically, distances from limiting members 210' and 210" of the first portion 910 and the second portion 920 opposite to the support surfaces 110' and 110" are controlled by the second control members 320' and 320" respectively. However, in different embodiments, the second control member 320' may be arranged only on the first portion 910 or the second control member 320" is arranged on the second portion 920. The second control member 320' is arranged on an other side of the base body 100 opposite to the support surface 110'. The second control member 320" is arranged below the support surface 110". The second control member 320" includes a second operating portion 321". The second operating portion 321" is exposed from a support surface hole 130 of the support surface 110". When the portable device is securely held between the first portion 910 and the second portion 920, the portable device covers at least part of the second operating portion 321".

Figure 14A:
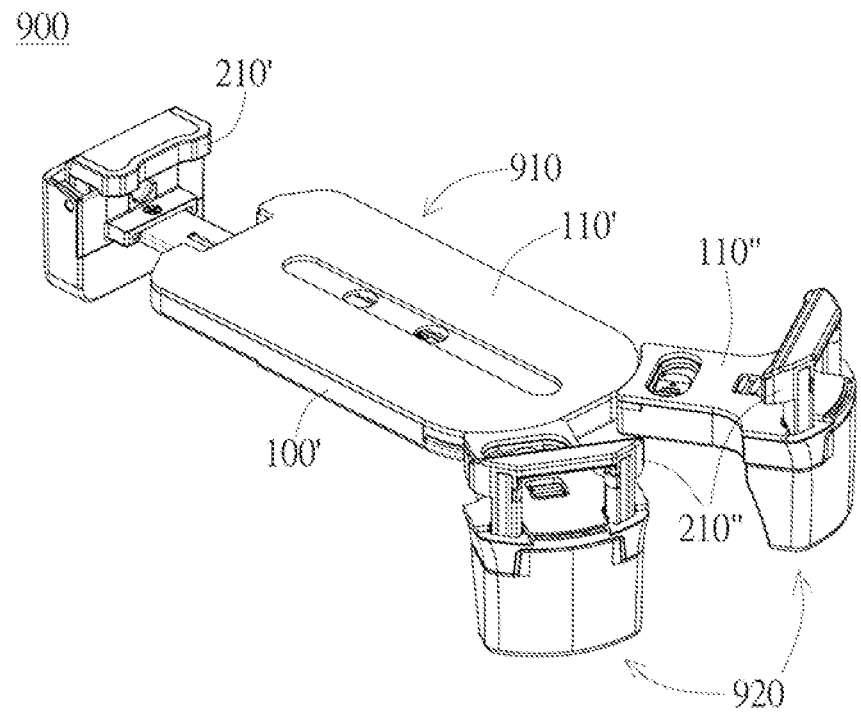
FIG. 14C to FIG. 14E are schematic diagrams of an embodiment of a connecting member in a fixing bracket according to the utility model.
Figure 14B:
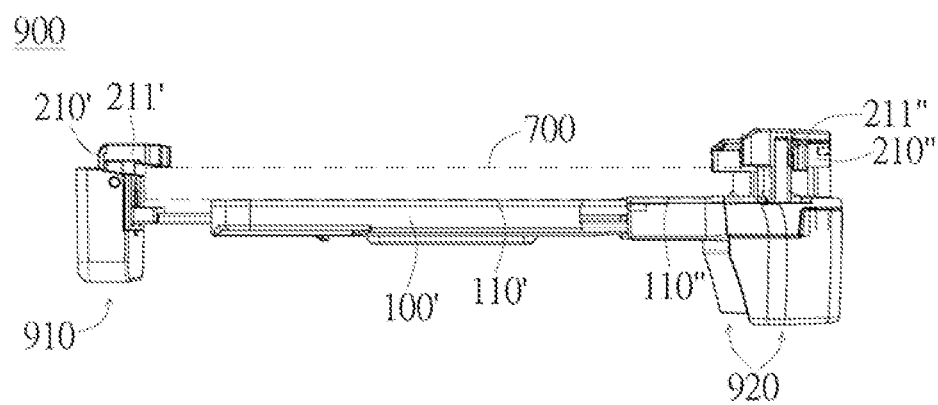

The process of using the fixing bracket 900 to fix the portable device is described below by using the embodiments shown in FIG. 12A to FIG. 14E. In the embodiments shown in FIG. 12A to FIG. 12C, the limiting members 210' and 210" are respectively located at lower positions opposite to the support surfaces 110' and 110", and the limiting member 210' is adjacent to the support surface 110'. In the embodiments shown in FIG. 13A to FIG. 13C, the user pulls the limiting members 210' and 210" up to be located at a higher position opposite to the support surfaces 110' and 110", and pulls the limiting member 210' away from the support surface 110', so as to increase a space between the limiting members 210' and 210" to put the portable device in the space. Then, as shown in FIG. 14A to FIG. 14C, the limiting member 210' is pushed close to the support surface 110' to abut against an end surface of the portable device 700 (see FIG. 14B), and then the limiting members 210' and 210" are respectively pressed down toward the support surfaces 110' and 110", to cause the limiting members to abut against a top surface of the portable device 700 (see FIG. 14B), thereby completing the fixing of the portable device 700.

Figure 14C:
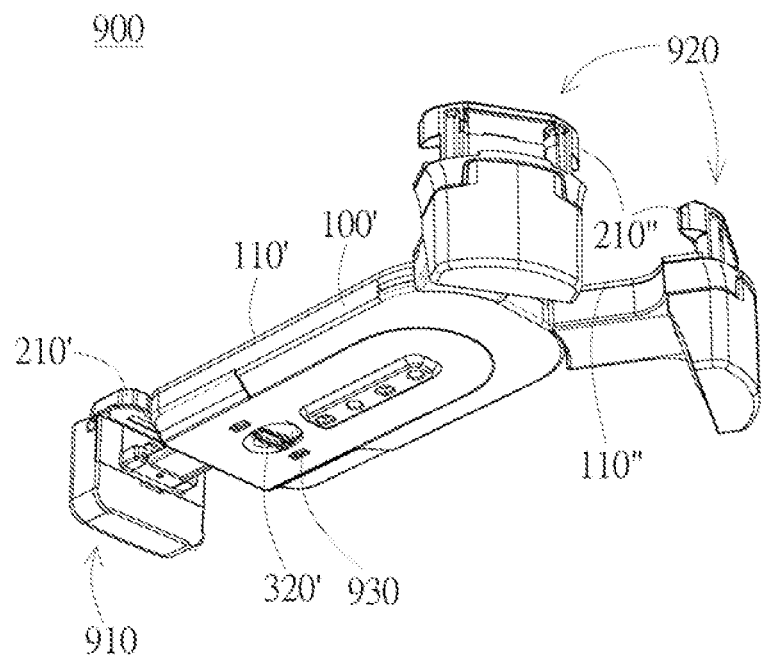
Figure 14D:
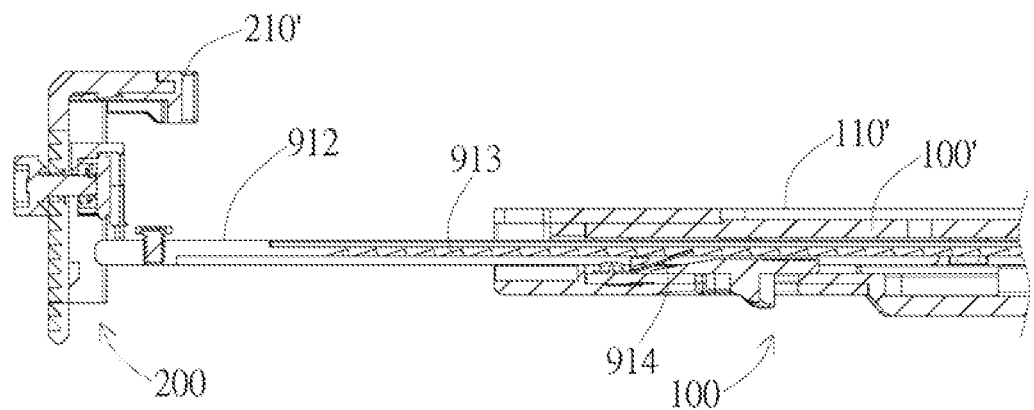
Figure 14E:
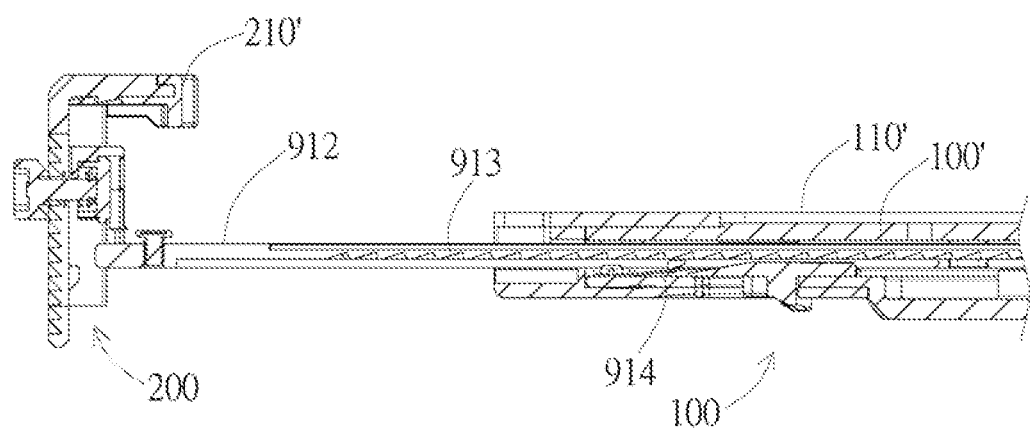

In the embodiments shown in FIG. 14D to FIG. 14E, the first portion 910 includes a connecting member 912 to connect the limiting device 200' to the base body 100'. A plurality of ratchet teeth 913 are arranged in a row on a surface of the connecting member 912. Specifically, the plurality of ratchet teeth 913 are arranged on a back surface of the connecting member 912 in a row at the same interval along a long axis direction of the connecting member 912. That is to say, the plurality of ratchet teeth 913 are arranged at a position where the connecting member 912 faces a leaf spring 914, so that the leaf spring 914 can be in an interference fit with one of the plurality of ratchet teeth 913 to cause the connecting member 912 to move only in one direction. In this embodiment, the plurality of ratchet teeth 913 are arranged to be in an interference fit with the leaf spring 914, so that the connecting member 912 is only allowed to move toward the base body 100'. That is to say, the connecting member 912 is only allowed to move in a direction of reducing a distance between the limiting device 200' and the base body 100'. A pitch between the ratchet teeth 913 is a unit distance by which the limiting device 200' and the base body 100' move.

In the embodiment shown in FIG. 14C, the fixing bracket 900 further includes a limiting hole 930 provided on an other side of the base body 100 opposite to the support surface 110' and for a lock such as a laptop lock to be inserted, to limit the movement of the first portion 910, thereby achieving a locking effect. However, in different embodiments, the limiting hole may alternatively be provided on an other side of the support surface 110" of the second portion 920. Moreover, the fixing bracket 900 may further include a locking device arranged in at least one of the first portion 910 or the second portion 920. When the locking device is in a locked state, the movement of the first portion 910 and the second portion 920 is restricted. In other words, a locking device may be arranged in at least one of the first portion 910 or the second portion 920 to limit the movement of the first portion 910 and the second portion 920.

Based on the above, the user can fix the portable device 700 to the fixing bracket of the utility model through simple operations. In addition, the fixing bracket 900 may be configured to fix and lock the portable electronic products 700 having different lengths, widths, and thicknesses, which is more convenient for use.

Although the foregoing description and drawings have disclosed exemplary embodiments of the utility model, it should be understood that various additions, many modifications, and substitutions may be made thereto without departing from the spirit and scope of the principles of the present utility model as defined by the appended claims. A person of original skill in the art of the utility model may understand that modifications of various forms, structures, arrangements, ratios, materials, elements, and components may be made to the utility model. Therefore, the embodiments disclosed in this specification shall be construed as describing the utility model, but are not intended to limit the utility model. The scope of the utility model should be defined by the appended claims, and covers the legal equivalents thereof, but is not limited to the foregoing descriptions.

SYMBOL DESCRIPTION

100—Base body
100'—Base body
110—Support surface
110'—Support surface
110"—Support surface
120—Support surface hollowed-out portion
130—Support surface hole
200—Limiting device
200'—Limiting device
201—Surface
202—Limiting device hollowed-out portion
210—Limiting member
210'—Limiting member
210"—Limiting member
211—Clamping portion
211'—Clamping portion
211"—Clamping portion
212—Ratchet teeth
220—Housing
220A—First housing
220B—Second housing
310—First control member
311—First operating portion
311"—First operating portion
312—Toothed engagement unit
320'—Second control member
320"—Second control member
321"—Second operating portion
710—First direction
720—Second direction
800—Fixing device
810—Fixing device
900—Fixing bracket
910—First portion
912—Connecting member
913—Ratchet teeth
914—Leaf spring
920—Second portion
930—Limiting hole
F1—Force
F2—Force
N—Normal direction
X—X-axis
Y—Y-axis
Z—Z-axis

What is claimed is:

1. A fixing device, configured to fix a portable device, the fixing device comprising:
a base body, having a support surface;
a limiting device, comprising a limiting member arranged on a side of the support surface, wherein the limiting member is movable along a normal direction of the support surface to fix the portable device to the support surface; and
a first control member, arranged below the support surface and configured to control movement of the limiting member along the normal direction of the support surface, wherein
when the portable device is fixed to the support surface, the portable device covers at least part of the first control member.

2. The fixing device according to claim 1, wherein
a support surface hollowed-out portion is arranged on the support surface;
the first control member comprises a first operating portion, wherein the first operating portion is exposed from the support surface hollowed-out portion; and
when the portable device is fixed to the support surface, the portable device covers at least part of the first operating portion.

3. The fixing device according to claim 2, wherein
the support surface extends along a direction parallel to an X-Y plane, the limiting member is movable along a direction of a Z-axis, and an X-axis, a Y-axis, and the Z-axis are orthogonal;
the first control member is movable along the X-axis to control the movement of the limiting member.

4. A fixing bracket, comprising:
a first portion; and
a second portion, connected to the first portion, wherein at least one of the first portion or the second portion comprises the fixing device according to claim 1, and is movable toward the other of the first portion or the second portion, to securely hold the portable device between the first portion and the second portion.

5. The fixing bracket according to claim 4, further comprising a second control member, wherein the second control member is arranged in at least one of the first portion or the second portion and configured to control movement of the at least one of the first portion or the second portion.

6. The fixing bracket according to claim 5, wherein the second control member is arranged on an other side of the base body opposite to the support surface.

7. The fixing bracket according to claim 5, wherein the second control member is arranged below the support surface, and comprises a second operating portion, wherein the second operating portion is exposed from a support surface hole of the support surface, and when the portable device is securely held between the first portion and the second portion, the portable device covers at least part of the second operating portion.

* * * * *